United States Patent [19]
Cooper et al.

[11] Patent Number: 5,118,422
[45] Date of Patent: Jun. 2, 1992

[54] PHOTOCATALYTIC TREATMENT OF WATER

[75] Inventors: Gerald Cooper, Boulder; Matthew A. Ratcliff, Lakewood, both of Colo.

[73] Assignee: Photo-Catalytics, Inc., Boulder, Colo.

[21] Appl. No.: 557,223

[22] Filed: Jul. 24, 1990

[51] Int. Cl.$^5$ ................................................ C02F 1/32
[52] U.S. Cl. .................................... 210/636; 210/748; 210/759; 210/763
[58] Field of Search ............... 210/636, 638, 674, 677, 210/694, 748, 759, 763, 908, 651, 650

[56] References Cited

U.S. PATENT DOCUMENTS

| | | | |
|---|---|---|---|
| 4,460,443 | 7/1984 | Somorjai et al. | 204/129 |
| 4,579,662 | 4/1986 | Jonsson | 210/636 |
| 4,861,484 | 8/1989 | Lichtin et al. | 210/638 |

Primary Examiner—Frank Spear
Attorney, Agent, or Firm—Ralph F. Crandell

[57] ABSTRACT

An ultraviolet driven photocatalytic post-treatment technique for the purification of waste water distillates, reverse osmosis permeates and spacecraft habitat atmospheric humidity condensates is described. Experimental results show that organic impurity carbon content of simulated reclamation waters at nominal 40 PPM level are reduced to, PPB using a recirculating batch reactor. The organic impurities common to reclaimed waste waters are completely oxidized employing minimum expendables (stoichiometric oxygen). This paper discusses test results and parameteric data obtained for design and fabrication of a bread-board system. The parametric testing includes UV light source evaluation, photolysis vs photocatalysis comparison, oxygen concentration dependence, temperature dependence, reactor mixing, disinfection features, photocatalyst loading, photocatalyst degradation studies and power consumption estimates. This novel post-treatment approach for waste water reclamation shows potential for integration with closed-loop life support systems.

19 Claims, 8 Drawing Sheets

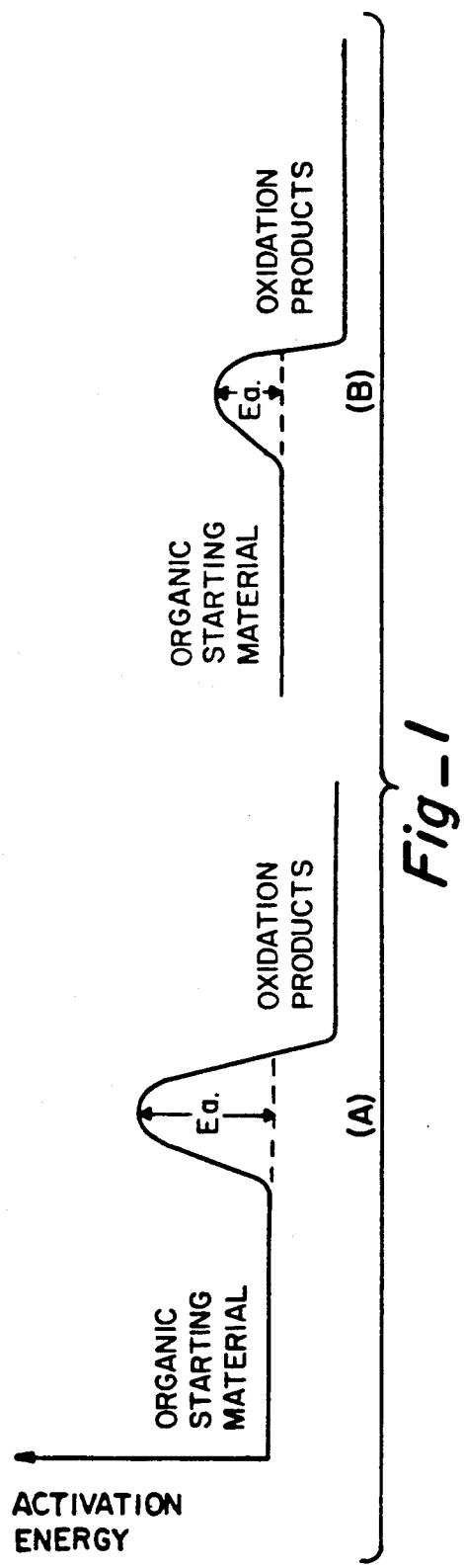
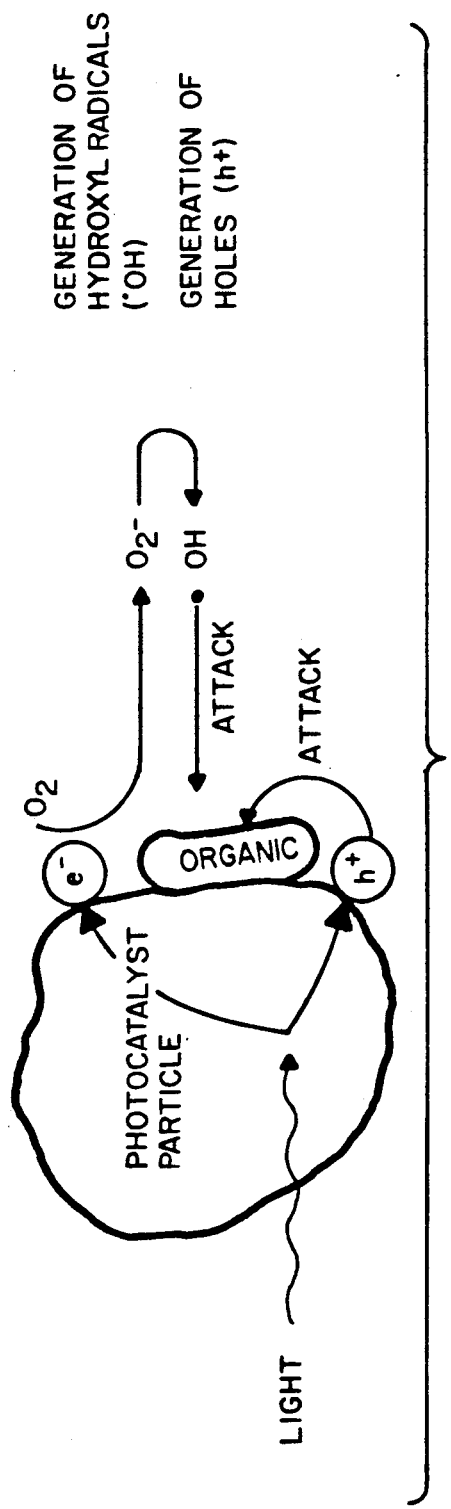

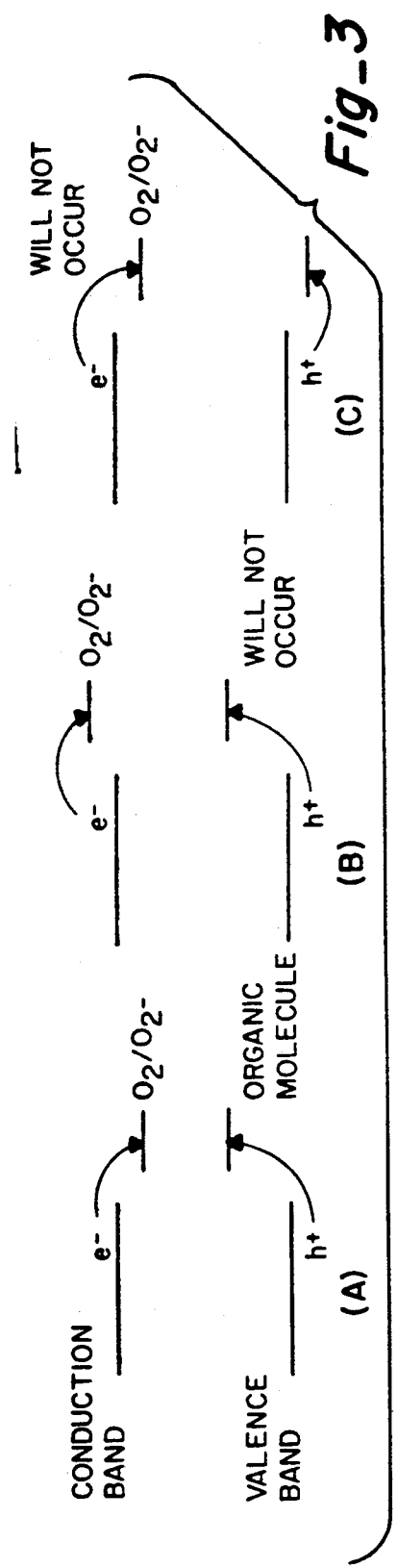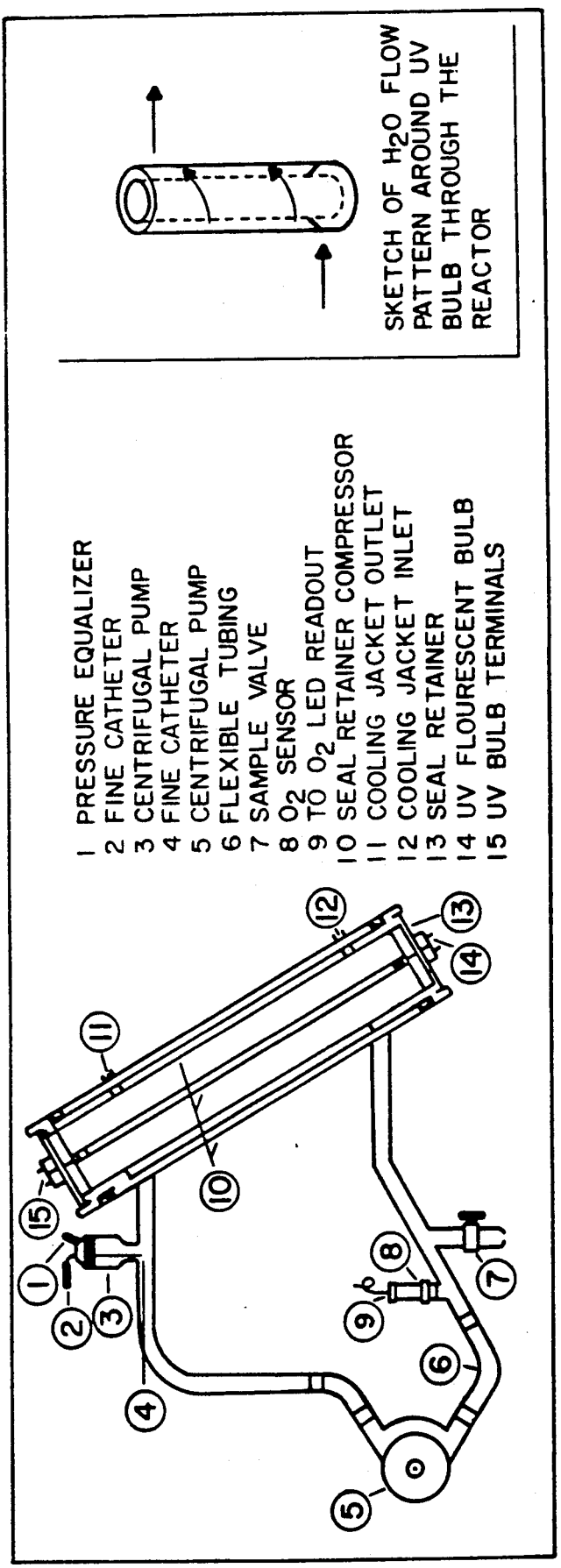

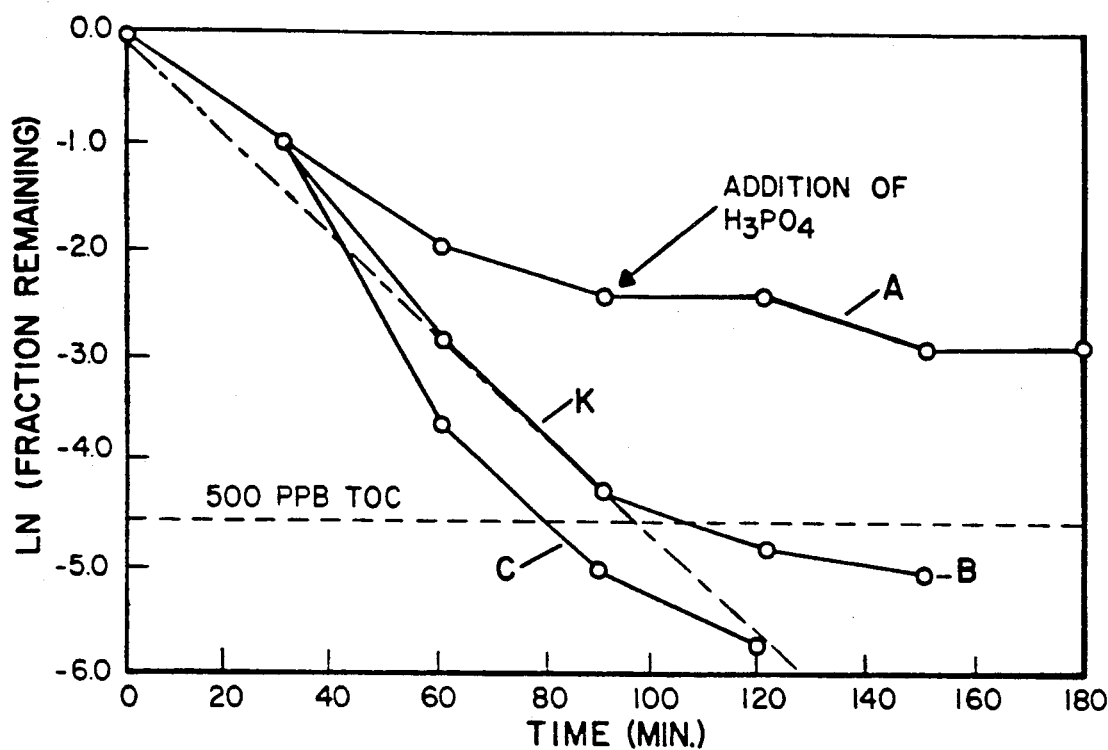
Fig_5
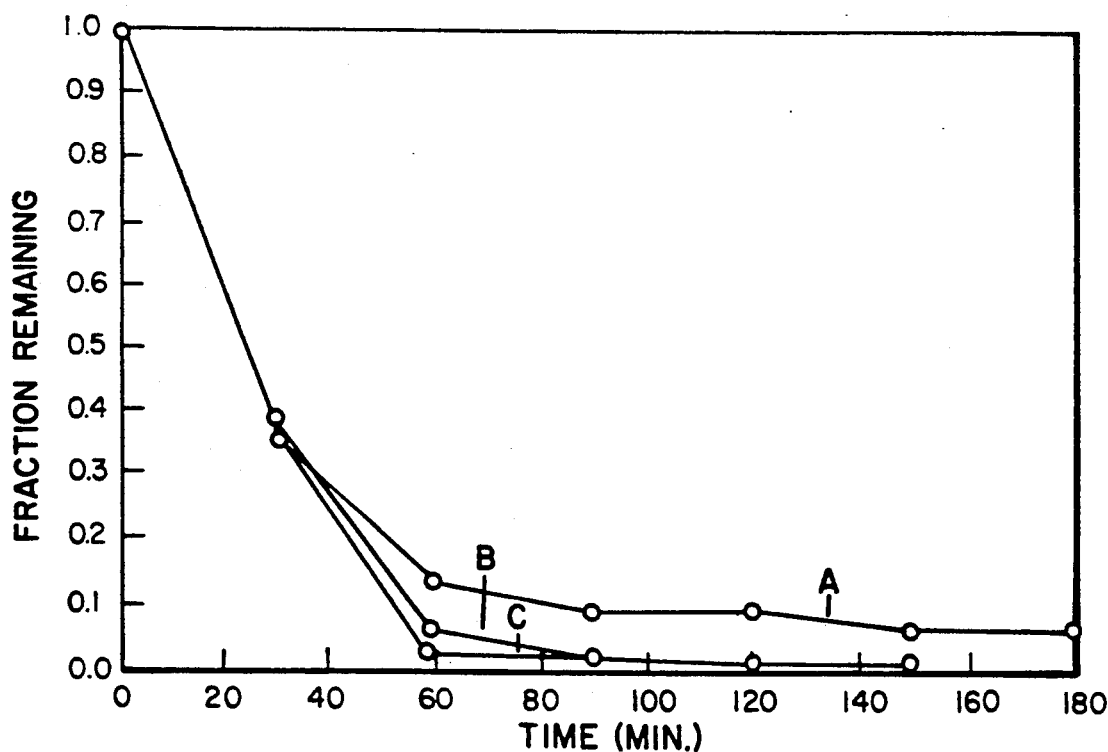
Fig_6

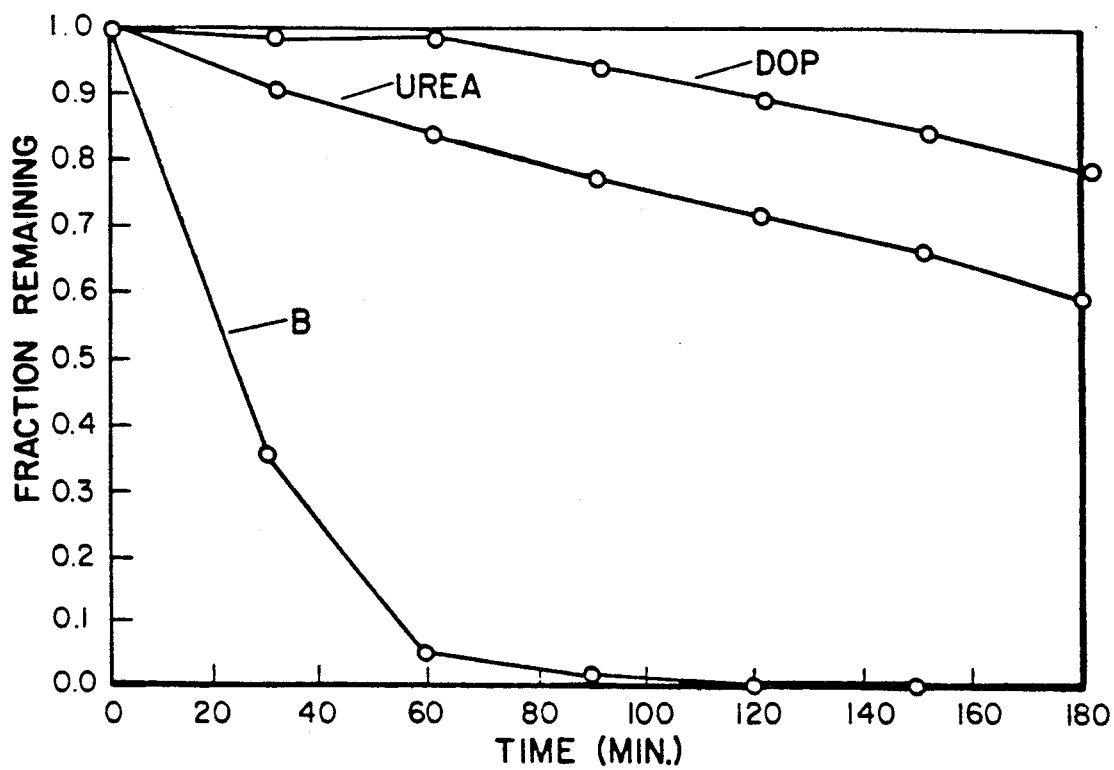
*Fig_7*
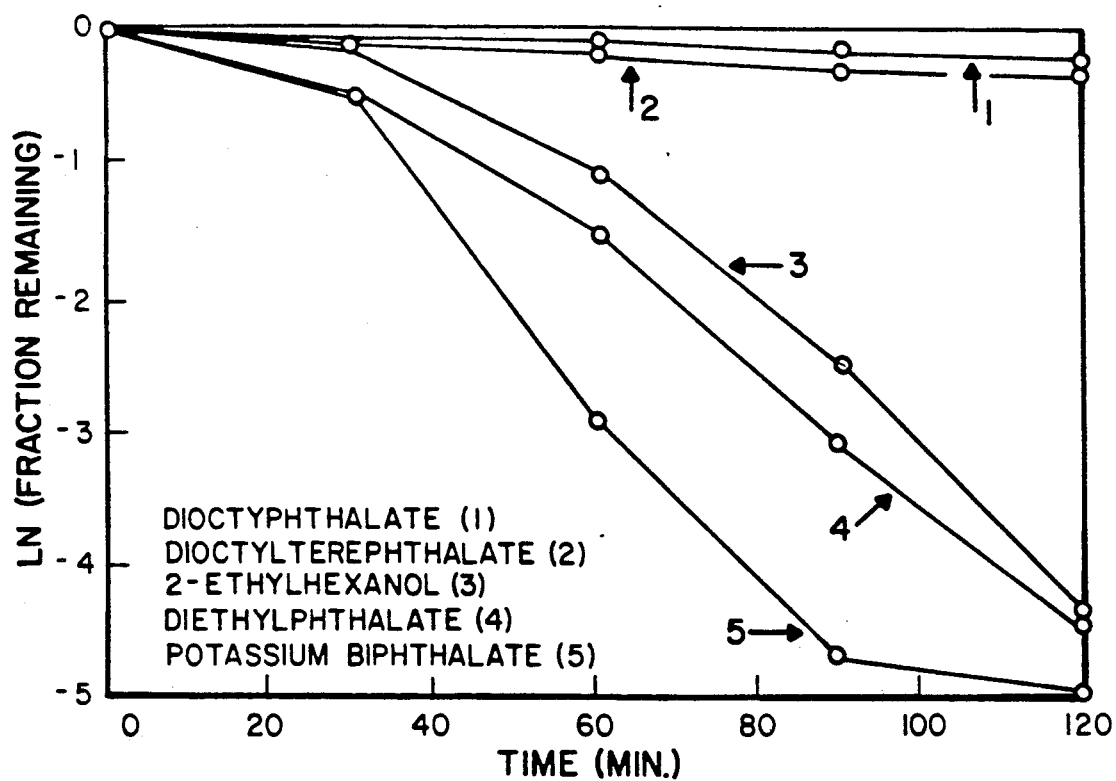
*Fig_8*

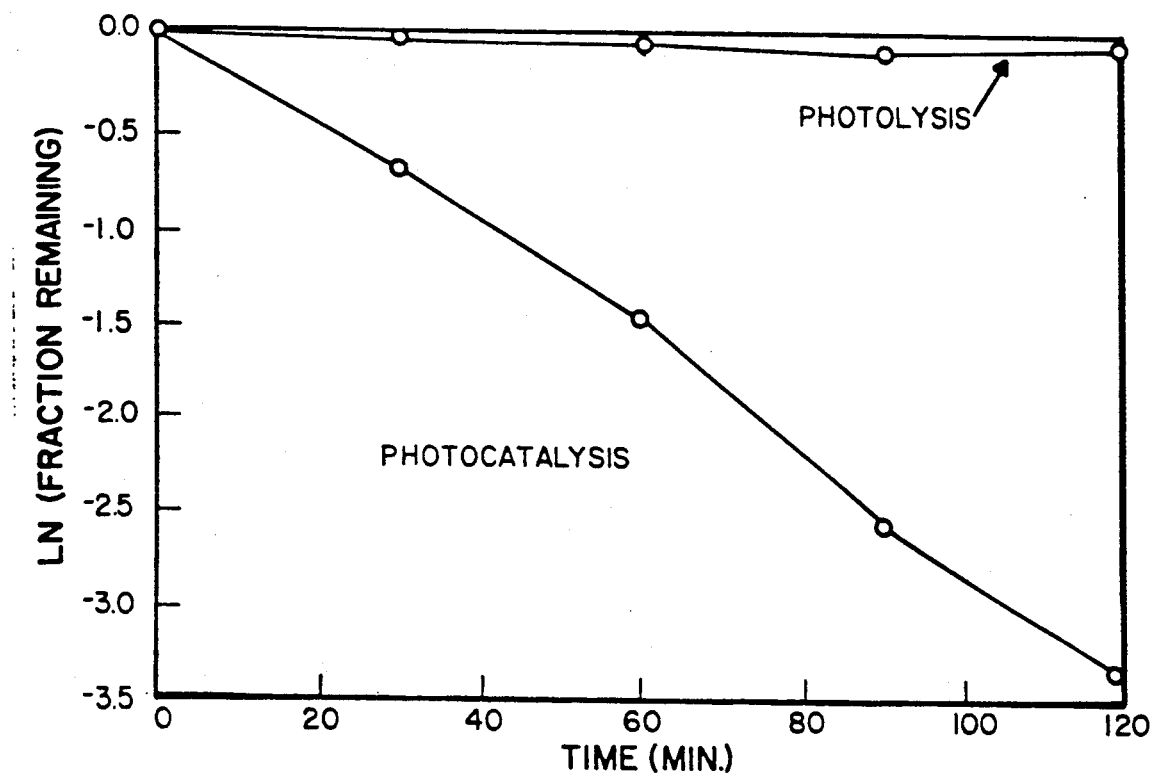
Fig_9
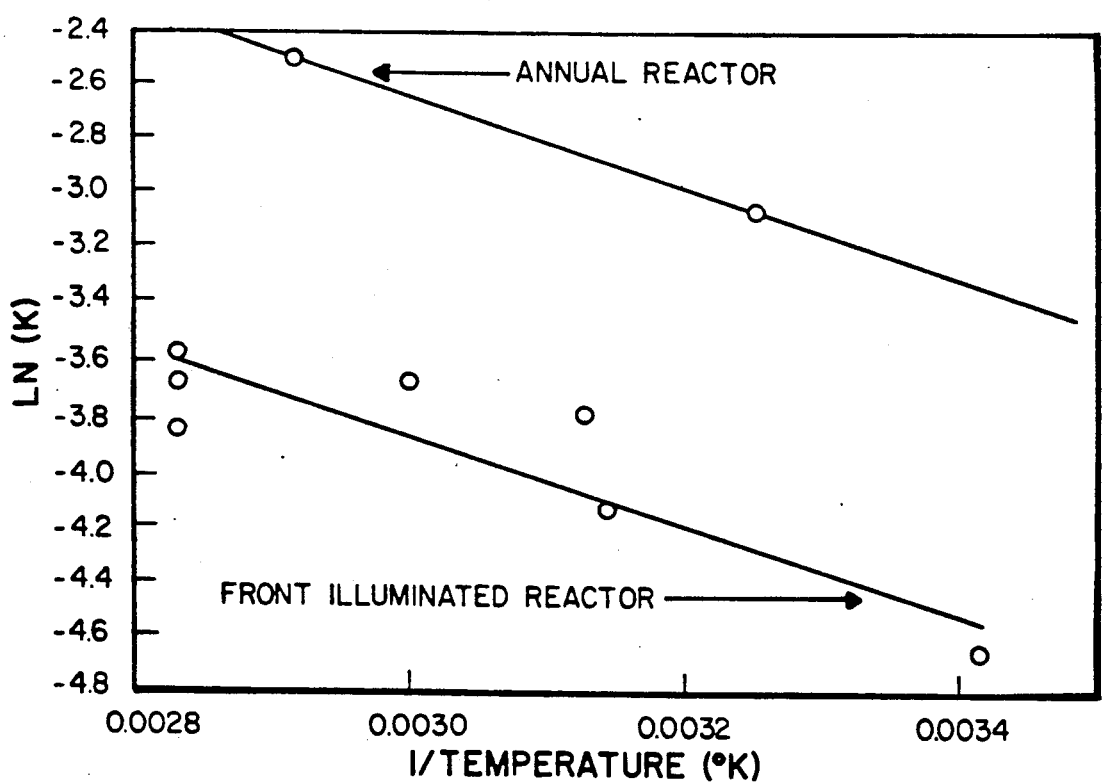
Fig_10

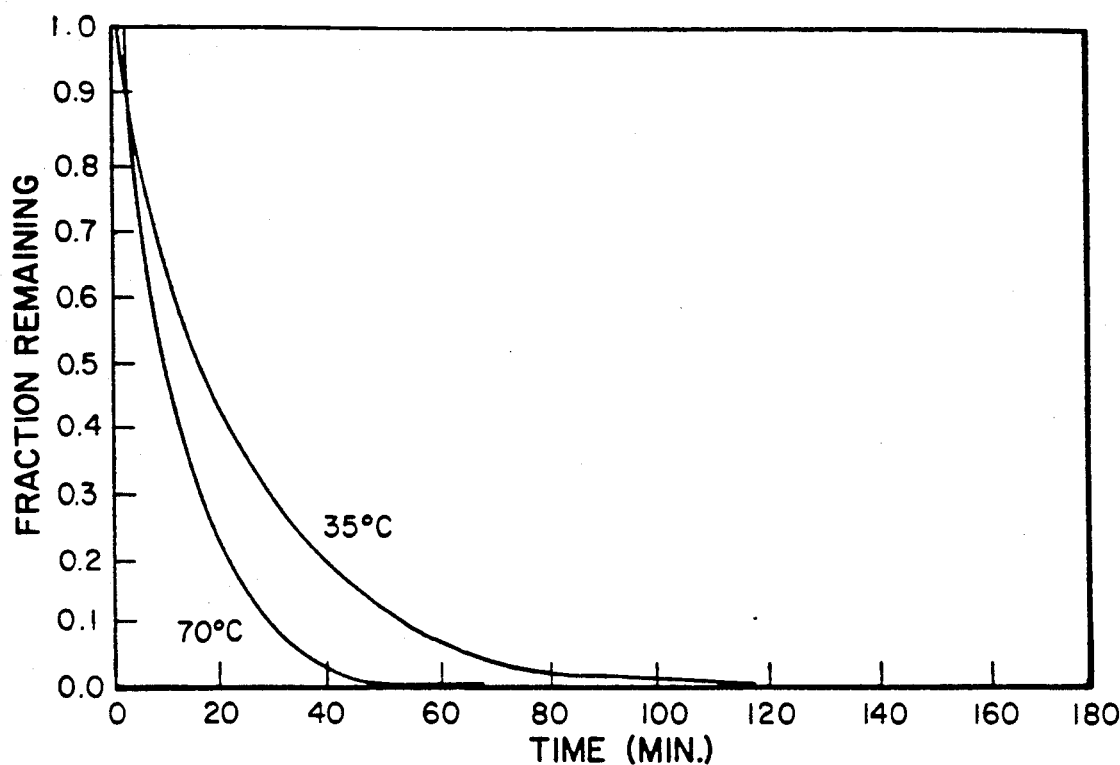
Fig_11
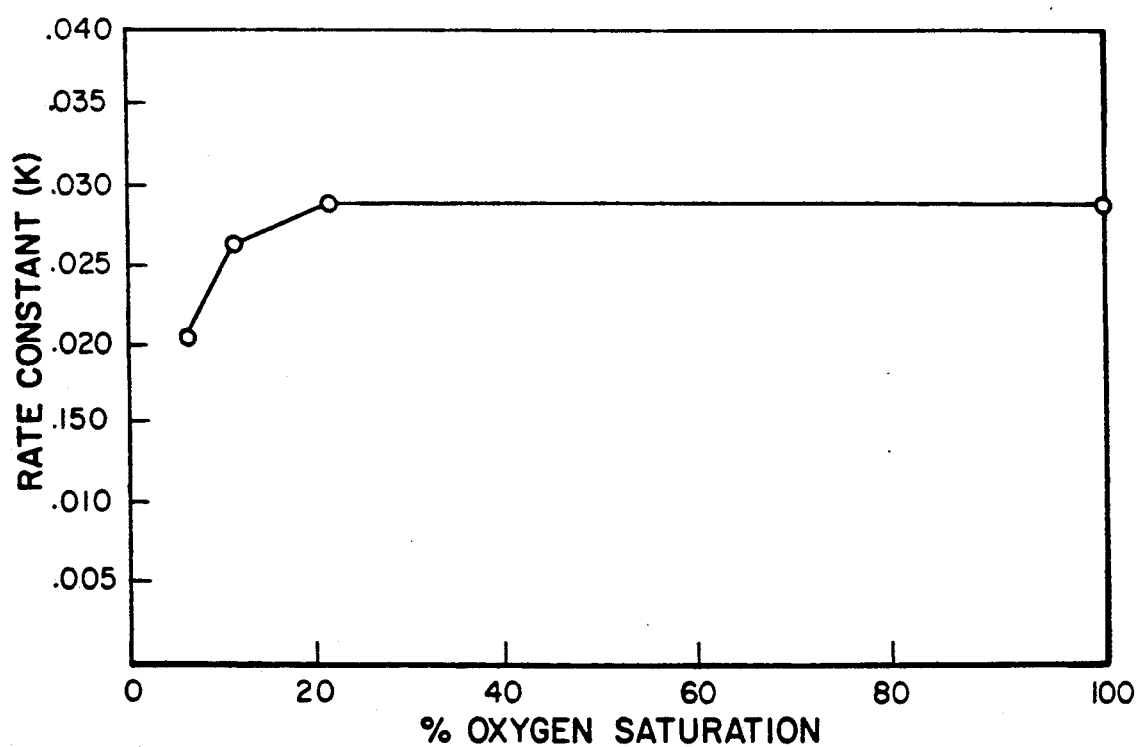
Fig_12

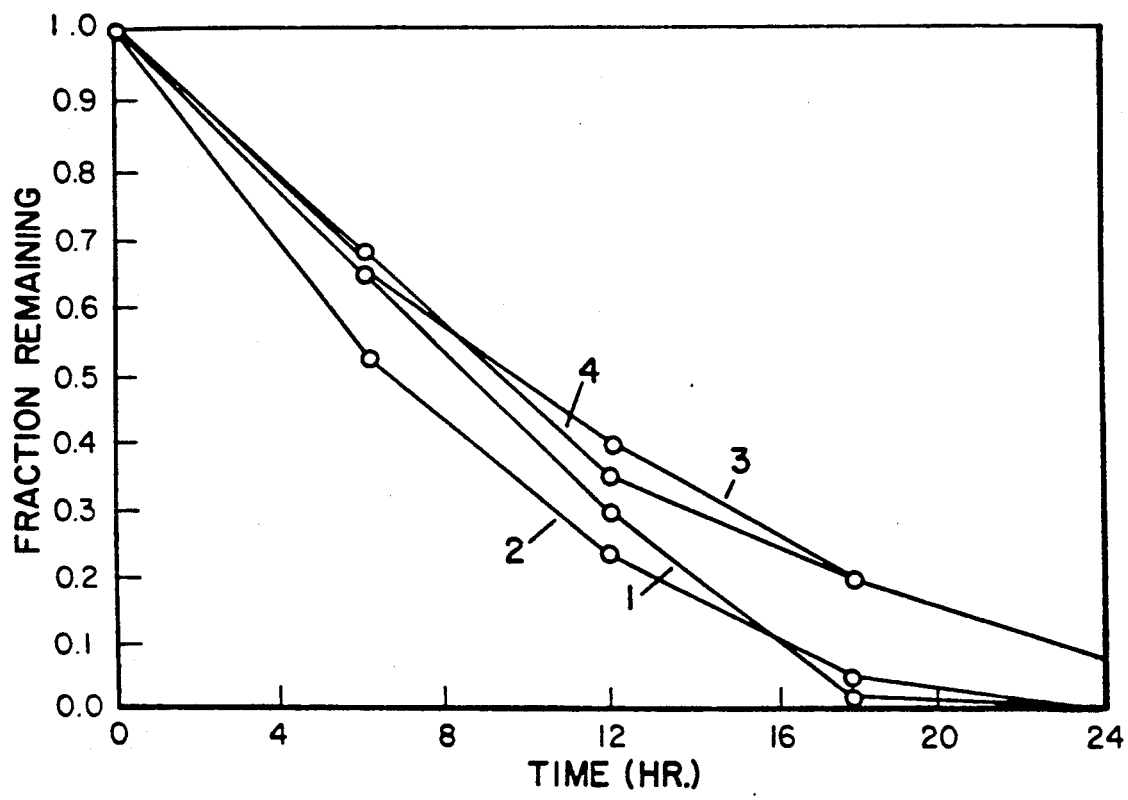
Fig_13

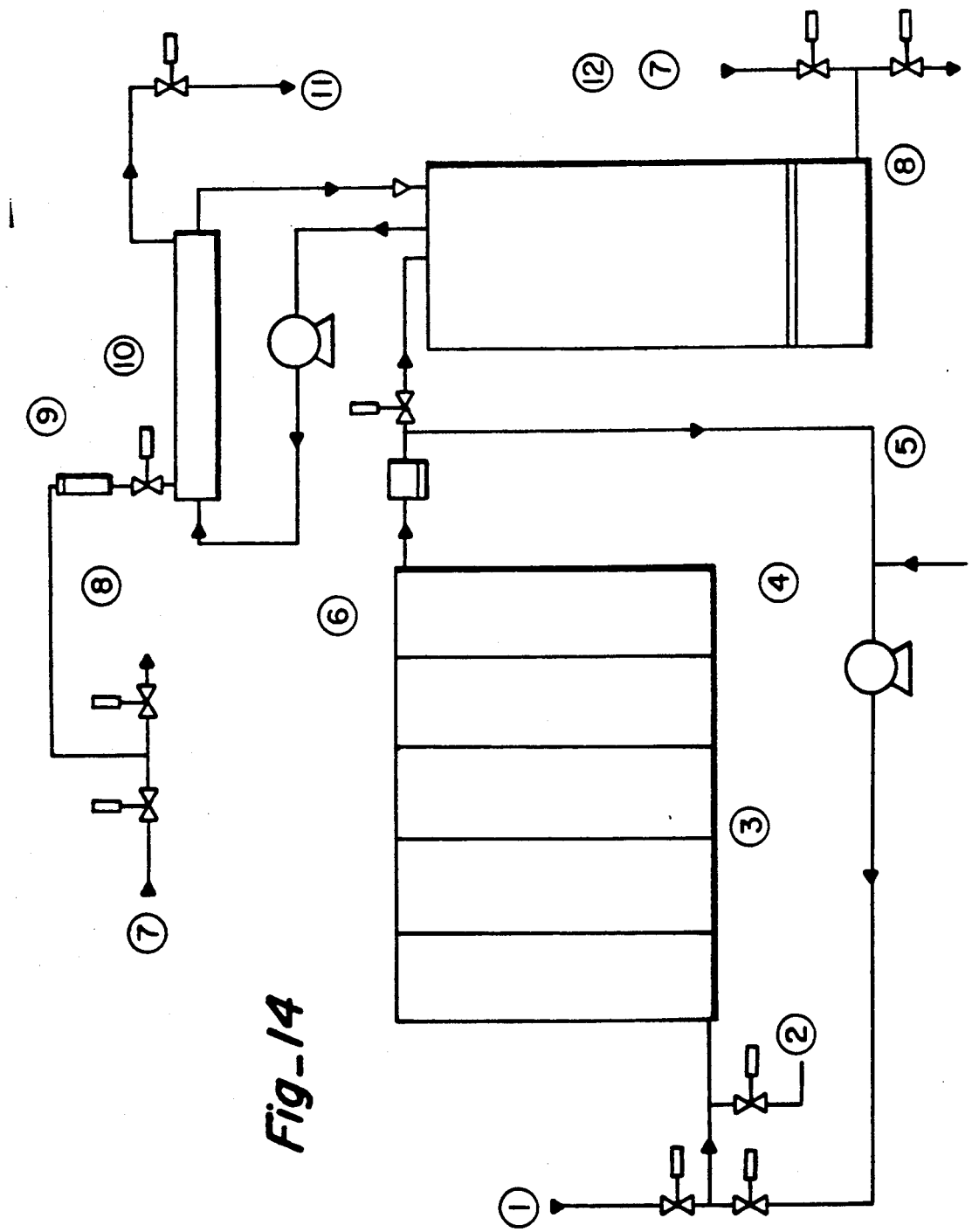

PHOTOCATALYTIC TREATMENT OF WATER

BACKGROUND OF THE INVENTION

Field of the Invention

The present invention relates to the photocatalytic treatment of water for removal of impurities therein by an oxidation-reduction reaction. More specifically, the invention relates to the reclamation of contaminated water by the use of a photocatalytic process.

OBJECTS OF THE INVENTION

It is the principal object of the present invention to provide an improved, efficient process for the removal of compounds present in highly dilute concentrations in water.

More specifically, it is an object of the present invention to provide an improved process for the removal of contaminants from water for the purpose of producing potable water from waste water.

DESCRIPTION OF THE DRAWINGS

FIG. 1. ENERGY DIAGRAMS FOR THE OXIDATION OF (A) A DISSOLVED ORGANIC MOLECULE AND (B) AN ORGANIC MOLECULE ADSORBED ONTO A CATALYTIC SURFACE.

FIG. 2. DEPICTION OF AN ORGANIC MOLECULE ADSORBED ONTO AN IRRADIATED PHOTOCATALYTIC POWDER PARTICLE.

FIG. 3. SEMICONDUCTOR BAND ENERGY DIAGRAMS INDICATING THERMODYNAMICALLY POSSIBLE (A) AND THERMODYNAMICALLY IMPOSSIBLE REDOX REACTIONS (B) AND (C)

FIG. 4. DIAGRAM OF THE NOMINAL 0.7 L PHOTOCATALYTIC ANNULAR REACTOR SYSTEM EMPLOYED IN THE MAJORITY OF THIS WORK.

FIG. 5. PLOT OF THE LN FRACTION REMAINING VS TIME DATA FOR THE PHOTOCATALYTIC DECOMPOSITION OF ORGANICS IN COCKTAILS A, B and C.

FIG. 6. PLOT OF THE FRACTION REMAINING VS TIME DATA FOR THE PHOTOCATALYTIC DECOMPOSITION OF ORGANICS COMPRISING COCKTAILS A, B and C IN TABLE 1.

FIG. 7. THE PHOTOCATALYTIC DECOMPOSITION OF 20 PPM TOC AS UREA, 15 PPM TOC AS DIOCTYLPHTHALATE(DOP), AND 50 PPM TOC IN COCKTAIL B(B) (FOR COMPARISON).

FIG. 8. NATURAL LOG OF THE FRACTION TOC REMAINING FOR THE PHOTOCATALYTIC DECOMPOSITION OF AQUEOUS DIOCTYLPHTALATE, DIOCTYLTEREPHTHALATE, 2-ETHYLHEXANOL, DIETHYLPHTHALATE, AND POTASSIUM BIPHTHALATE.

FIG. 9. COMPARISON OF PHOTOCATALYTIC VS, AEROBIC PHOTOLYTIC AND ANAEROBIC PHOTOLYTIC DESTRUCTION OF AQUEOUS ORGANICS EMPLOYING 254 NM RADIATION.

FIG. 10. ARRHENIUS PLOT OF LN(K) VS 1/T DATA FOR THE PHOTOCATALYTIC DECOMPOSITION OF COCKTAIL B PERFORMED IN THE ANNULAR REACTOR AND COCKTAIL A PERFORMED IN A FRONT-ILLUMINATED, RECIRCULATING REACTOR.

FIG. 11. COMPARISON OF THE PHOTOCATALYTIC PURIFICATION RATES AT 35° AND 70° C.

FIG. 12. PLOT OF THE DEPENDANCE OF THE PHOTOCATALYTIC RATE CONSTANT ON THE OXYGEN CONCENTRATION.

FIG. 13. PLOT OF THE PHOTOCATALYTIC DECOMPOSITION OF NOMINAL 1000 PPM TOC ORGANICS SHOWING THE PHOTOCATALYST RECYCLING FOUR TIMES:1, 2, 3, 4.

FIG. 14. DIAGRAM OF THE PROPOSED PHOTOCATALYTIC WATER PURIFICATION SYSTEM.

DESCRIPTION OF THE PREFERRED EMBODIMENT

Upon irradiating semiconductor powders with band-gap or higher energy photons, electron($e^-$)/hole($h^+$) pairs are created within the crystalline powder particles by the same physical processes that they are generated in photovoltaic devices (8). In a photovoltaic device these charges are made to run through a wire to do electrical work; whereas in a photoelectrochemical device these carriers are injected into solution species (organic molecules, for example) resulting in the performance of redox chemical reactions.

As depicted in FIG. 1, the photoelectrochemical oxidation of organics is exoergic and would tend to occur spontaneously; however, the kinetics, in the absence of a suitable catalyst, are extremely slow.

An important aspect of the photocatalytic process is the adsorption of the organic molecules onto the extremely large surface area presented by the finely divided powders dispersed in the water. A frequent result of chemical adsorption is a diminishment in the activation energy of reaction. This catalytic effect, depicted in FIG. 1a, compares the energetics of oxidizing a dissolved organic molecule catalytically and non-catalytically. Note that the activation energy, Ea, of the non-catalytic reaction (FIG. 1a) is large and the reaction products are lower in energy than the starting materials. FIG. 1b depicts the energetics of an organic molecule adsorbed onto a catalytic surface. Although the starting material and final products are at the same energies as in FIG. 1a, Ea is lower. Operationally this results in faster reaction rates than would occur in the absence of the catalyst. Metal and mixed metal oxides are commonly employed as catalysts to facilitate many ordinary chemical reactions of organic molecules including oxidations. However, in photoelectrochemical applications advantage is taken of the fact that the solid phase (a metal oxide semiconductor) is also photo-active and the generated charge carriers are directly involved in the organic oxidation. In this case the process is photocatalytic and is depicted in FIG. 2. The adsorption of the band-gap photon by the semiconductor particle results in the formation of an electron ($e^-$)/hole($h^+$) pair. The electrons generated in the conduction band react with solution oxygen forming the dioxygen anion ($O_2-$) species which subsequently undergoes further reactions resulting in the production of the powerfully oxidizing hydroxyl radical species, OH. These powerful oxidants are known to oxidize organic compounds by themselves. Additionally, the strongly oxidizing holes generated in the valence band have sufficient energy to oxidize all organic bonds. It is the provision of a catalytic surface and the dual attack by the powerful oxidizing radicals and holes that make photocatalysis such an effective method for oxidizing aqueous organics.

FIG. 3(a) shows the thermodynamic conditions necessary for the performance of redox chemistry. In the conventional band energy scheme electrons tend to spontaneously move downhill (lose energy) and holes, because of their positive charge, move 'uphill'. The hole acceptor, in this example an organic molecule, must lie above the valence band and the electron acceptor, $O_2$, must lie below the conduction band. The charge transfer from both bands must occur essentially simultaneously in order to preserve charge conservation. FIGS. 3(b) and (c) are examples of thermodynamically impossible redox reactions because either a conduction band (b) or valence band (c) charge transfer is forbidden due to the mismatched energetics of one of the redox couples.

Solutions employed in the parametric tests were made by dissolving in deionized water (DI) organic concentrates containing organic compounds which occur in waste water RO permeates, distillates and spacecraft humidity condensates. The solution compositions and concentrations are shown in Table 1. In some experiments urea and dioctylphthalate were absent from the test cocktail because of their resistance to photocatalytic oxidation. This is discussed below.

In most of the experiments to date the annular recirculating batch reactor having an ID of 3.8 cm, OD of 5.1 cm, and length of 56 cm shown in FIG. 4 was employed. The total system volume was approximately 0.7 L. including the pump and connecting tubing. The light sources, either a 350 nm emitting UV fluorescent or 254 nm emitting low-pressure Hg lamp was at the center of the annulus. In most experiments the 254 nm light of the low-pressure Hg lamp was utilized because the photocatalytic process did not appear to differentiate between the two sources. In the temperature dependance experiments, some of the data were collected employing a 350 nm front illuminated recirculating batch reactor.

TABLE 1

THE ORGANIC COMPOUNDS AND THEIR CONCENTRATIONS COMPRISING THE NOMINAL 40 PPM TEST ORGANIC COCKTAILS

| COMPOUND | COCKTAIL DESIGNATION | | |
|---|---|---|---|
| | A (TOC) PPM | B (TOC) PPM | C (TOC) PPM |
| ACETIC ACID | 9 | 9 | 9 |
| BENZOIC ACID | 3 | 3 | 3 |
| BENZYL ALCOHOL | 3 | 3 | 3 |
| BENZALDEHYDE | 0.5 | 0.5 | 0.5 |
| CAPROLACTAM | 2 | 2 | 2 |
| ETHANOL | 2 | 2 | 2 |
| 2-BUTOXYETHANOL | 0.5 | 0.5 | 0.5 |
| N,N-DIMETHYL FORMAMIDE | 0.5 | 0.5 | 0.5 |
| OCTANOIC ACID | 3 | 3 | 3 |
| PHENOL | 3 | 3 | 3 |
| CRESOL | 0.5 | 0.5 | 0.5 |
| PROPIONIC ACID | 9 | 9 | 9 |
| DIOCTYLPHTHALATE | 3 | 0 | 0 |
| UREA | 1 | 0 | 0 |
| IONS | 0(DI $H_2O$) | 0(DI $H_2O$) | *PRESENT |

*ION CONC. IN PPM: $Ca^{+2}$(7), $Na^+$(37), $K^+$(15), $SO_4^{-2}$(28), $PO_4^{-3}$(3), $Cl^-$(41), $F^-$(4)

In a typical experiment, approximately 5 ml aliquots were removed from the reactor, through a stopcock, at intervals, for subsequent total organic carbon (TOC) analysis on a Dohrman DC-80 total organic carbon (TOC) analyzer. The analyzer was calibrated on a daily basis employing potassium biphthalate as a standard. The aliquots were acidified and gas purged to remove dissolved carbon dioxide prior to injection into the analyzer. The TOC value obtained prior to illumination was the time zero sample to which subsequent measurements with illumination are compared.

During a run, the temperature was controlled to 35° C. using a water jacketed reactor. Because oxygen was rapidly consumed in the initial phase of photocatalytic purification, the solution oxygen concentration, was monitored by an oxygen probe (YSI) and controlled, to approximately 20% of saturation, by the addition of pure oxygen via a fine catheter.

REACTOR DESIGN

Some parameters considered in designing the photocatalytic water purification reactors are the following:

Mass Diffusion

The turbulence generated in the photocatalytic reactors gives rise to eddys of macroscopic size. Since the submicron photocatalyst particles are much smaller than the eddy size, mass transfer rates to the particles are governed by the diffusion of reactants through a stagnant layer surrounding the particles. Consider, for example, a molecule such as trichloroethylene (TCE) that has very rapid photocatalytic decomposition kinetics. In decomposition experiments performed with 100 PPM TCE, which occurs with an 18% quantum efficiency (ratio of the rate of TCE molecules decomposed to the rate of incident photons), a $9 \times 10^{-7}$ moles $L^{-1}s^{-1}$ mass consumption rate is observed. Based on calculations for the diffusion of TCE and oxygen to the catalyst particles, about $7.5 \times 10^{-3}$ moles $L^{-1}s^{-1}$ and $3.4 \times 10^{-2}$ moles $L^{-1}s^{-1}$ reaction rates, respectively, should be supportable at 20° C. Calculation of the rate of oxygen diffusion from a finely divided gas phase (100 um diameter bubbles) into the solution yields a $1.1 \times 10^{-3}$ moles $L^{-1}s^{-1}$ rate of mass arrival. Thus by considering the primary diffusive processes, the rate of arrival of reactants to the particles' surface is 4 to 5 orders of magnitude greater than the rate of reactant consumption. Therefore, the photocatalytic decomposition rates of TCE and, most probably, the organics employed in this study, are not diffusion controlled at the light intensities employed here.

Chemical Reactions

The photocatalytic oxidation of aqueous organics is dominated by their reaction with hydroxyl radicals. These types of homogeneous reactions have a typical rate constant on the order of $10^9$ to $10^{10}$ L moles$^{-1}$s$^{-1}$. Under aerobic conditions the steady state concentration of photocatalytically generated hydrogen peroxide resulting from aqueous O2 reduction or water oxidation has been measured at about $15 \times 10^{-6}$M. Assuming that the steady state hydroxyl radical concentration is of the same order as the hydrogen peroxide, then for $7.5 \times 10^{-4}$M (100 PPM) TCE the theoretical rate of TCE reaction with hydroxyl radicals can be calculated by the following expression:

reaction rate = $k_2$(TCE)(.OH) =

($10^9$ to $10^{10}$)(7.5 × $10^{-4}$)(15 × $10^{-6}$) = 11 to 113 moles $L^{-1}s^{-1}$.

This is substantially larger than our experimentally observed rate for the photocatalytic oxidation of $9 \times 10^{-7}$ moles $L^{-1}s^{-1}$. Therefore, the hydroxyl radical attack, intrinsic to aqueous photocatalytic oxidation, does not appear to be a rate limiting step.

Bulk Mixing

The following illustrates the most basic considerations of photocatalyst light adsorption and its relationship to convective mixing. For a 0.1 wt % photocatalyst loading, experiments have shown that 90% of the light is absorbed within 0.08 cm. This is primarily due to the large UV absorption coefficient of the photocatalyst and therefore, most of the photoelectrochemistry occurs within this illuminated region. The onset of turbulence occurs for a Reynolds number (Re) of approximately 2000. Then flow characterized by Re equal to 4000 should provide adequate bulk mixing within the reactor. Using Deissler's empirical formula and dimensionless values for velocity and distance, a viscous sublayer 0.03 cm thick is calculated to adhere to the reactor tube wall. By operating the reactor with an Re 4000, a significant portion of the photoactive region is ensured of being within the well mixed turbulent zone.

Adsorption of Organics

The photocatalytic process must be dependent, to a degree, on the adsorption of the organics onto the photocatalyst particles' surface. The adsorption isotherm of an organic is dependent on factors such as pH and the presence of other solutes. Presently, the dependence of photocatalytic reaction rates on this variable are not well understood and this is essentially an uncontrolled parameter in the water purification process. Measurements indicate that in an initially 100 PPM TOC cocktail made using concentrate "B", approximately 2 PPM of the available TOC is adsorbed onto the photocatalyst powder and reactor wall surface.

Interfacial Charge Transfer

The transfer of charge carriers ($e^-$ and $h^-$) across the semiconductor/solution interface is considered to be rate limiting for the slow reaction of photoelectrochemical water splitting. However, in the photocatalytic degradation of aqueous organics, the reduction of dissolved molecular oxygen is fast. This is because oxygen is a reactant at relatively high concentration and is a one electron transfer reduction, in comparison to the low concentration multielectron transfers involving water splitting intermediates. Simultaneously, rapid hole injection is expected because of the surface concentration of the water and adsorbed organics, both of which are hole acceptors. Although there are techniques for increasing interfacial charge transfer rates, their success is dependent on the exact photoelectrochemical process and process conditions. It is unclear at present whether charge transfer is rate limiting for this system.

The discussion and calculations above indicate that for the annular reactor and operating conditions employed in this study, purification rates are not mixing, diffusion, or chemical reaction rate limited. Experiments employing the annular reactor, in which the volumetric flow rate was varied from 8 to 30 L min$^{-1}$, showed only small differences in the purification rates of water over this flow rate range. For this reactor, the lower flow rate corresponds to a Reynolds number of about 2000, the onset of turbulent flow. This indicates that mass transfer limitation has indeed been avoided. The relatively high quantum efficiency of photocatalytic degradation of TCE (about 18%), together with the considerations above, strongly suggests that the photocatalytic purification rates are light limited. Control of charge transfer or adsorption to enhance purification efficiency is not within the scope of this development effort. Rate increase should be observed with increased light intensity, however operating the low-pressure mercury lamps this way would reduce their life. The above considerations reduce to the fact that the most efficient operation and optimized purification rate of the photocatalytic system is achievable by minimizing the viscous sublayer depth in order to provide a deep well-mixed zone within the photoactive region.

PHOTOCATALYTIC OXIDATION OF AQUEOUS ORGANICS

Consider the following: photocatalytic reactions are usually described by Langmuir-Hinshelwood kinetics, which in the case of dilute solutions, reduces to the familiar exponentially decaying first-order expression(1) where $C_o$ is $$\text{fraction remaining} = C(t)/C_o = exp(-kt) \quad (1)$$

the initial concentration, k is the first order rate constant, and t is the time. Application of linear regression analysis to $ln(C(t)/C_o)$ vs time data yields a straight line with slope $-k$ (FIG. 5). It must be noted that one constant, k, is being used to described the decomposition of a multicomponent system. Although actual kinetics may deviate somewhat from the oversimplified model above, the employment of first-order k's, when appropriate, facilitates comparison and discussion of various reactions and parameters.

FIGS. 5 and 6 show the natural log and fraction of TOC remaining vs time data, respectively, for the photocatalytic decomposition of cocktails A, B and C. The photocatalytic decomposition of the organics in the two cocktails B and C exhibit almost identical kinetics, approximated by eq(1) throughout the run for a k value of 0.0470 min$^{-1}$. Cocktail B was made using DI water and is therefore practically ion-free. The water of cocktail C, however, had $Ca^{+2}$, $Na^+$, $K^+$, $SO_4^{-2}$, $PO_4^{-3}$, $Cl^-$, $F^-$ ion concentrations shown at the bottom of Table 1, approximating RO permeate. This demonstrates that ion concentrations found in RO permeate do not affect the aqueous photocatalytic oxidation process. This is expected because these ions are generally found to be electrochemically inactive (i.e. they have redox potentials that exceed those for water splitting or sufficiently slow kinetics that preclude significant reaction). Second order effects due to ion adsorption on the surface of the photocatalyst particles can cause shifting of the flat-band potential. For example, a drastic anodic shift in flat-band potential could slow down or thermodynamically preclude the vital oxygen reduction reaction. However, if flat-band potential modification due to these ions was occurring, the manifestation of the effect was negligible.

For cocktails A and B (FIG. 5), the initial kinetics, down to about 0.37 fraction remaining are approximately equal. For B, the small upward deviation from approximate linearity after 90 minutes is probably an experimental artifact attributable to higher uncertainty in TOC analysis owing to low level organic carbon contamination. For cocktail B, 500 PPB TOC concentration (denoted by dashed line in FIG. 5) is reached experimentally in 110 minutes; or, as predicted by equation (1), in the absence of contamination, in 98 minutes. For cocktail A, below the 0.37 fraction, the decomposition of organics slows down markedly and almost stops at about 3 PPM. This decrease in rate is attributed to the extremely slow oxidation kinetics of urea and/or dioctylphthalate, whose individual decompositions are shown in FIG. 7. For cocktail A, lowering the pH to about 3 by the addition of 2 drops of 85% phosphoric acid, permitted the degradation of the remaining dioctylphthalate. This degradation is explained by the hydrolysis of dioctylphthalate to phthalic acid and 2-ethylhexanol (the isooctyl group) at the lowered pH. These hydrolysis products are rapidly photocatalytically oxidized. Urea decomposition was probably not significantly assisted by the lowered pH and simply occurs very slowly over the duration of the experiment.

In an attempt to elucidate the extremely slow photocatalytic decomposition of dioctylphthalate (octyl groups on 1,2 positions), the decompositions of 2-ethylhexanol, dioctylterephthalate (octyl groups on 1,4 positions), diethylphthalate, and potassium biphthalate were investigated; the results are shown in FIG. 8. Note that except for the dioctylphthalates, the phthalates are generally rapidly photocatalytically decomposed. The difficulty in oxidizing dioctylphthalates was reflected in the TOC analyzer by the very long analyses times. The analyzer employs 185 nm UV light and simultaneous persulfate chemical oxidation for achieving organic oxidation to $CO_2$. Since the extremely slow decomposition of the dioctylphthalates cannot be attributed to steric effects or unique resonance stability and because the hydrolizates are individually rapidly decomposed, their recalcitrance is attributed to their high water insolubility. Phthalate compounds were found in Space Lab humidity condensate and a source is placticizers commonly found in Tygon tubing.

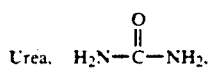

Urea, $H_2N-C(=O)-NH_2$, is a product of human metabolism. Amides are generally more difficult to oxidize than amines owing to the resonance interaction of the electron pair on nitrogen with the adjacent carbonyl group. Urea's particularly slow kinetics is attributed to the additional resonance stability imparted by the second amine group on the lone carbon atom in the molecule (see structure above). The stability of urea towards radical attack is exemplified by comparing the rate constants of OH and other radical reactions with urea in Table 2. The important feature of this data is that urea reacts several orders of magnitude more slowly than the average organic. For the case of OH, urea was by far the slowest reactant when compared to the other organic compounds in the cited reference.

TABLE 2

RATE CONSTANTS FOR THE REACTION OF VARIOUS RADICALS WITH AQUEOUS UREA. THE AVERAGE RANGE OF OTHER AQUEOUS ORGANICS TABULATED FOR COMPARISON.

| RADICAL | K (urea) (L mole-1 s-1) | K (average) (L mole-1 s-1) | REFERENCE |
|---|---|---|---|
| .OH | $7.9 \times 10^5$ | $10^9$ to $10^{10}$ | (10) |
| $e_{aq}^-$ | $3.0 \times 10^5$ | $10^8$ to $10^{10}$ | (10) |
| .H | $<3 \times 10^4$ | $10^8$ | (10) |

TABLE 2-continued

RATE CONSTANTS FOR THE REACTION OF VARIOUS RADICALS WITH AQUEOUS UREA. THE AVERAGE RANGE OF OTHER AQUEOUS ORGANICS TABULATED FOR COMPARISON.

| RADICAL | K (urea) (L mole-1 s-1) | K (average) (L mole-1 s-1) | REFERENCE |
|---|---|---|---|
| $CO_3.-$ | $<1 \times 10^3$ | $10^6$ to $10^8$ | (15) |
| $O_3$ | $5 \times 10^{-2}$ | $10^2$ to $10^5$ | (15) |

PHOTOLYSIS VS PHOTOCATALYSIS

The 254 nm emission lines of Hg can excite electronic transitions that may ultimately lead to the decomposition of aqueous organics. FIG. 9 compares direct photolysis with photocatalysis (fraction of TOC remaining vs time). The photolytic degradation rates of the organics are shown to be negligible in comparison to photocatalysis.

Two principal factors contribute to the ability of either photolysis or photocatalysis to effect the destruction of organics: 1. the degree of light absorption and 2. the lifetime of the excited state (i.e. the systems ability to remain in the excited state until degradation reaction pathways can be followed).

Employing a UV spectrophotometer, it was found that approximately 50% of the 254 nm radiation is absorbed within 1 cm for an approximately 50 PPM TOC organic cocktail in the absence of the photocatalyst. Because this is relatively high light attenuation, the reason for the low photolytic decomposition of the organics has to be due to rapid de-excitation of the molecules.

The electronic excited state is usually short lived because of the three photophysical intramolecular deexcitation pathways (intersystem crossing, fluorescence, and nonradiative or thermal decay) and intermolecular relaxation. These photophysical processes effectively compete with the fragmentation of and the ultimate destruction of the molecule. Also, oxygen, which is normally present in water, effects intermolecular relaxation because it is known to be an efficient excited state quencher. Photolysis experiments performed with oxygen present or absent did not significantly affect degradation rates. Therefore it is concluded that the failure of photolysis to effect significant organic degradation is attributed to rapid de-excitation via intramolecular pathways.

TEMPERATURE EFFECT

The temperature dependence of first order rates is given to good approximation by the Arrhenius equation (2):

$$k(T) = A^* \exp(-Ea/RT), \qquad (2)$$

where Ea is the activation energy, R is the gas constant, and A is sometimes called the frequency factor. FIG. 10 is a plot of ln(k) vs 1/T for the photocatalytic decomposition of cocktail B performed in the annular reactor and cocktail A performed in a different, front-illuminated, recirculating reactor. The identical slopes of the plots reflect the fact that Ea is a thermodynamic quantity independent of reactor geometry, but the upwardly displaced slope of data obtained in the annular reactor reflects faster rates owing to more efficient reactor design and/or greater photon flux per volume of water. A value of Ea=3.5 Kcal/mole was found for the two cocktails. Approximately the same activation energy values are reported in the literature for the photocatalytic oxidation of oxalic and formic acid. Since the organic cocktails are composed primarily of carboxylic acids, this value is concordant with the literature. It appears to be a general property of the photocatalytic oxidation of aqueous organics that anomalously low activation energy barriers are observed. This probably reflects the fact that the activation energy of the rate determining step is not provided by thermal processes. The reaction rate obtained by increasing the temperature from 35° to 70° C. is shown in FIG. 11 is increased by a factor of 1.8. For comparison, a classical reaction having Ea=15 kcal/mole would exhibit a factor of 12 increase in rate.

OXYGEN DEPENDANCE

The dependence of the photocatalytic rate constant on the oxygen concentration is shown in FIG. 12. It should be mentioned that up to approximately 0.5 fraction TOC remaining, the reaction appears to be insensitive to the oxygen concentration. After this point the dependence on oxygen concentration is slightly more pronounced. The k values in FIG. 12 were obtained by linear regression analysis on the first three data points of a run. FIG. 12 shows that an oxygen concentration above 20% saturation (the equivalent oxygen derived from an air saturated solution) does not significantly increase reaction kinetics. However, below this value a noticeable overall decrease in rate is observed.

The stoichiometric oxygen requirement for photocatalytically purifying 1 L of water containing 40 PPM TOC was determined from the quantity of $O_2$ required to oxidize all the organics in cocktail A (Table 1). This correlates to approximately 1.5 moles for every mole of organic carbon or 0.112 L of oxygen per liter of 40 PPM TOC cocktail solution. This is the total amount of $O_2$ consumed during the photocatalytic oxidation cycle. In a breadboard system the $O_2$ will be metered into the photocatalytic reactor through a fine catheter to provide only the amount of $O_2$ required for oxidation of the TOC. This control should prevent gas/liquid interfaces from forming as a result of exceeding $O_2$ saturation (43 mg $L^{-1}$). The $CO_2$ produced is more soluble in water (1688 mg $L^{-1}$) than $O_2$. Therefore, much higher amounts of TOC can be oxidized before gas/liquid interfaces would develop by exceeding $CO_2$ solubility.

In order to compare the quantity of oxygen consumed by photocatalytic water purification with that of respiration consider that one human needs approximately 3 L of water per day. Multiplication of 0.112 L $O_2$/L of $H_2O$ by 3 yields 0.336 L/day/person of oxygen for water purification; an average 68 Kg human requires 3.5 mL/Kg-min (18) or 343 L/day/person for respiration at rest. Clearly the amount of oxygen required to provide potable water is insignificant in comparison to that needed for respiration.

PHOTOCATALYST LOADING

Preliminary work has shown that photocatalyst loading of 0.01% and 0.2 wt % yielded rate constants of 0.0152 and 0.0295 $min^{-1}$. Thus, for a factor of 20 increase in photocatalyst loading only an approximate doubling of the rate is observed. For photocatalyst loading higher than 0.2 wt %, no substantial rate increase was achieved.

PHOTOCATALYST DEGRADATION

In order to measure the useful life of the 0.2 wt % photocatalyst, accelerated degradation tests were performed using nominal 1000 PPM TOC solutions. Thus the decomposition of 1000 PPM TOC was equated to using the photocatalyst 25 times for the purification of water contaminated by compounds found in cocktail B (nominally 40 PPM TOC). The curves in FIG. 13 show the repeated cycling of the same photocatalyst four times. The purification rate was observed to slow down by the third and fourth cycles. At this time it was observed that significant amounts of photocatalyst was adhering to the outer reactor wall. Therefore, the rate decreases are presently attributed to the removal of large amounts of the photocatalyst from suspension. It is speculated that either the high concentrations of organics or the formation of intermediate oligomers caused adhesion of the photocatalyst to the outer wall. Also, the organic adsorbed onto the adhered photocatalyst was effectively shielded from the radiation by the remaining suspended photocatalyst and therefore, from further degradation. It is realized that loss of catalyst had some effect on loss of oxidation activity. The amount of loss has not yet been determined. Currently, degradation tests are being performed with 100 PPM TOC solutions in an attempt to avoid catalyst losses described above.

Assuming that 0.2 wt % photocatalyst loading can be recycled at least 100 times without significant activity loss are correct, then a 3L/person/day water requirement translates into a 0.6 g/person/day photocatalyst requirement. For a crew of six on a year mission this scales up to a total of 1314 g (2.9 lb) of photocatalyst.

PHOTOCATALYTIC DISINFECTION

Preliminary results on experiments to measure the disinfecting ability of photocatalytic water purification are reported in a Phase I study. The organism *P. cepacia* used in these studies had been shown to be extremely resistant to the standard disinfection concentrate, 10% iodine-providone. Experiments were carried out which measured the survival rate of *P. cepacia* cells that were maintained in the reactor for various periods of time. The initial concentration was $10^7$ cfu/ml. The solution oxygen concentration was approximately that of air saturation. After one hour of incubation in the illuminated reactor more than 99.99% of the cells had been destroyed, based on the fact that no colonies were present on agar plates which had been inoculated with 0.1 ml of a 100-fold dilution of the cell suspension. Cell death was not simply due to suspension in dilution medium, since cell viability was not affected after three hours of incubation in dilution medium in the absence of the photocatalyst and light. Furthermore, cell viability was not affected by incubation with the photocatalyst, with the recirculation pump on, in the dark for one hour. Therefore, cell destruction was not caused by the shear forces within the pump. Photocatalytic water purification appears to provide disinfection, but more rigorous controlled tests are required to fully asses its potency.

CATALYST PARTICLE SEPARATION

Preliminary work on the removal of the photocatalyst from the purified water have been successfully demonstrated by the utilization of a cross-flow filtration technique. In this procedure an Enka Microdyne Module (Model MD 020 CP 2N) constructed from 0.1 m2 of polypropylene capillary membrane having a pore size of 0.2 um and an ID of 1.8 mm was used. By employing periodic back-pulsing through the module, a small residual amount of photocatalyst was found adhering to the filter membranes. Further longevity testing of the process is in progress.

SYSTEM DESIGN

In the proposed prototype, the reactor geometry will be constrained by the low pressure Hg light source's cylindrical geometry, D=2.5 cm and active length =81 cm. For a one lamp reactor, annular geometry (FIG. 1) permits surrounding the light source with fluid. To meet NASA requirements, a multi-lamp reactor system is needed. Two options are: stringing together in series individual annular units or combining many lamps in one reactor vessel. At present, elementary fluid mechanical calculations indicate that the combination of several lamps in one reactor vessel may result in significant volumes of poor mixing or else require an average volumetric flow rate substantially greater than necessary with the annular reactor. The practical result of this may be inefficient use of light and increased electrical energy demands of the system. However, because the latter reactor design may offer weight savings, the final preprototype design is still under consideration.

The preliminary system design concept is depicted in FIG. 14. This preprototype will be operated in the batch mode with discrete unit operations for the photocatalytic oxidation of organics and separation of the photocatalyst from the purified water. Design considerations for the problems of fluid handling in microgravity include the use of hydraulic accumulators and bladder lined tanks for the holding and transfer of the liquids to prevent the problems of gas/liquid phase mixing. The waste-water distillate/RO permeate will be transferred under positive pressure from a hydraulic accumulator to the reactor loop where the photocatalyst and oxygen will be added. Stoichiometric oxygen, plus an excess equivalent to the air saturated value, will be added to the system over time by an oxygen injector. The oxygen injector will be a fine stainless steel catheter backed by a metering unit. The total amount of oxygen added to the system will be enough to ensure complete and rapid oxidation of organics and also avoid a gas/liquid phase mixture at the end of a run. A dissolved oxygen sensor will be employed for monitoring. An expansion tank, utilizing a diaphragm or floating piston, will be employed to accommodate the small temporary pressure/volume changes caused by the addition and consumption of oxygen and temperature changes. The reaction mixture will be recirculated by a centrifugal pump through the photocatalytic reactor loop to effect purification. Once purified, the photocatalyst/water slurry will be transferred under positive pressure to another hydraulic accumulator that acts as an interface between the reactor and filtration unit. A second centrifugal pump then circulates the slurry through the cross-flow filter to effect separation. The permeate (pure water) will be collected in a bladder lined reservoir for storage while the slurry retentate is concentrated in the hydraulic accumulator. The slurry is then transferred from the hydraulic accumulator under pressure to the reactor, completing the cycle. The backpulse hydraulic accumulator stores a small volume of purified water to periodically back-wash the filter to prevent excessive photocatalyst caking and plugging of the filter. The backpulsing is effected by pneumatic pressurization through a solenoid valve to the hydraulic accumulator without interruption of the slurry circulation through the filtration unit.

ESTIMATED POWER REQUIREMENTS

The principal electrical energy demands of the 4.5 L photocatalytic water purification prototype system are UV light generation (five 30 W low-pressure Hg lamps) and recirculating pump power (1/25 HP @ approximately 130 W). The data suggests that the 500 PPB TOC level of TOC will be reached in less than 90 minutes. After water purification is achieved, additional pumping power is required for fluid transfer and to effect particle separation. The latter pumping needs will be met by employing a motor having similar power demands as the recirculating pump. However, in the latter case, it estimated that this process will take only 6 minutes. Therefore, a coarse estimate of the systems power demands are the following:

| LIGHT GENERATION: | 5 lamps × 30 W/lamp × 1.5 hr = 225 W-hr. |
|---|---|
| PUMPING: | 130 W × 1.5 hr = 195 W-hr. |
| FLUID TRANSFER AND FILTERING: | 130 W × 0.1 hr = 13 W-hr. |
| | TOTAL: 433 W-hr. for 4.5 L. |

The photocatalytic water purification process described here is effective for oxidizing organic impurities common to reclaimed waste waters and humidity condensates to carbon dioxide at ambient temperatures. TOC concentrations below 500 PPB are readily achieved. The temperature dependance of the process is well described by the Arrhenius equation and an activation energy barrier of 3.5 Kcal/mole. Urea and some insoluble phthalate esters are only slowly oxidized. Preliminary work, in a previous Phase I study, indicated that sterilization features are exhibited by the destruction of greater than 99.99% of initially $10^7$ colony forming units of $P.\ cepacia$. The only expendable required by the photocatalytic system is oxygen at an excess slightly greater than stoichiometric. For a 40 PPM TOC contamination, the stoichiometric oxygen requirement is approximately 0.11 L $O_2$/L $H_2O$. The estimated energy requirements of the system are 100 W-hr/L $H_2O$. Preliminary photocatalyst degradation studies indicate that at least 5 L of initially 40 PPM water can be purified per gram of photocatalyst. Particle separation subsequent to water purification appears to be readily accomplished with minimal energy consumption by the utilization of cross-flow filter technology. Separation of the catalyst particles from the purified water under microgravity will be facilitated by the avoidance of gas/liquid phase mixing. Other microgravity considerations implemented in the breadboard system will be the utilization of hydraulic accumulators and bladder tanks. The product of this development will be a breadboard photocatalytic purification system which employs multiple batch cycle operations for post-treatment of reclaimed waters for application in closed-loop life support systems in space based environments.

We claim:

1. A process for purifying a water feedstock containing an oxidizable contaminant compound, comprising the steps of mixing the water feedstock with a photocatalytic semiconductor having a particle size in the range of about 0.01 to about 1.0 micron and in an amount of between about 0.01% and about 0.2% by weight of the water, exposing said water and semiconductor mixture to band-gap photons for a time sufficient to effect an oxidation of the oxidizable contaminant compound thereby to purify said water, separating said purified water from said semiconductor by crossflow membrane filtration, and recovering said purified water.

2. A process as defined in claim 1 including the step of determining the kinetics of the photocatalystic reaction and thereafter calculating the time sufficient to effect the oxidation reaction.

3. A process as defined in claim 1 including the step of intermittent back flushing during said cross-flow filtration.

4. A process as defined in claim 1 wherein said semiconductor is selected from the group consisting of $TiO_2$, $ZnO$, $CdS$, $CdSe$, $SnO_2$, $SrTiO_3$, $WO_3$, $Fe_2O_3$, and $Ta_2O_5$.

5. A process as defined in claim 4 wherein said semiconductor is anatase $TiO_2$.

6. A process as defined in claim 1 wherein said band-gap photons are contained in ultraviolet light.

7. A process as defined in claim 1 wherein the flow of said water and semiconductor mixture is at a Reynolds number of about 2000.

8. A process as defined in claim 6 including the step of adding oxygen gas to the water and semiconductor mixture during exposure to ultraviolet light.

9. A process as defined in claim 1 wherein said semiconductor is recycled in the process after separation from the purified water.

10. A process for removing oxidizable contaminants from a water feedstock containing an oxidizable contaminant compound, comprising the steps of mixing the water feedstock with a photocatalytic semiconductor selected from the group consisting of $TiO_2$, $ZnO$, $CdS$, $CdSe$, $SnO_2$, $SrTiO_3$, $WO_3$, $Fe_2O_3$, and $Ta_2O_5$, having a particle size in the range of about 0.01 to about 1.0 micron, and in an amount between about 0.01% and about 0.2% by weight of the water; flowing said water and semiconductor mixture through a reactor at a Reynolds number of about 2000 while simultaneously adding oxygen gas to the water and semiconductor mixture and exposing said water and semiconductor mixture to ultraviolet light for a time sufficient to effect oxidation of the oxidizable contaminant compound thereby to purify said water; separating said purified water from said semiconductor in a crossflow membrane filter with intermittent back flushing during said cross-flow filtration; recovering said purified water; and recycling said semiconductor to the water feedstock.

11. A process as defined in claim 10 including the step of determining the kinetics of the photocatalytic reaction and thereafter calculating the time sufficient to effect the oxidation reaction.

12. A process as defined in claim 10 wherein said semiconductor is anatase $TiO_2$.

13. A process as defined in claim 10 wherein said ultraviolet light supplies band-gap photons.

14. A process for removing oxidizable contaminants from a water feedstock containing an oxidizable contaminant compound, comprising the steps of mixing the water feedstock with a photocatalytic semiconductor selected from the group consisting of $TiO_2$, $ZnO$, $CdS$, $CdSe$, $SnO_2$, $SrTiO_3$, $WO_3$, $Fe_2O_3$, and $Ta_2O_5$, having a particle size in the range of about 0.01 to about 1.0 micron, and in an amount of between about 0.01% and about 0.2% by weight of the water; flowing said water and semiconductor mixture through a reactor at a Reynolds number of about 2000 while simultaneously adding oxygen gas to the water and semiconductor mixture and exposing said water and semiconductor mixture to ultraviolet light for a time sufficient to effect oxidation of the oxidizable contaminant compound thereby to purify said water; separating said purified water from said semiconductor in a crossflow membrane filter; and recovering said purified water.

15. A process as defined in claim 14 including the step of determining the kinetics of the photocatalytic reaction and thereafter calculating the time sufficient to effect the oxidation reaction.

16. A process as defined in claim 14 including the step of intermittent back flushing during said cross-flow filtration.

17. A process as defined in claim 14 where said semiconductor is anatase $TiO_2$.

18. A process as defined in claim 14 wherein said ultraviolet light supplies band-gap photons.

19. A process as defined in claim 14 wherein said semiconductor is recycled in the process after separation from the purified water.

* * * * *